(12) United States Patent
Quickert

(10) Patent No.: US 6,618,923 B1
(45) Date of Patent: Sep. 16, 2003

(54) METHOD FOR TIGHTENING SCREW JOINTS

(75) Inventor: Matthias Quickert, Pforzheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/601,468

(22) PCT Filed: Jan. 14, 1999

(86) PCT No.: PCT/EP99/00172

§ 371 (c)(1),
(2), (4) Date: Sep. 20, 2000

(87) PCT Pub. No.: WO99/39880

PCT Pub. Date: Aug. 12, 1999

(30) Foreign Application Priority Data

Feb. 5, 1998 (DE) ......................................... 198 04 459

(51) Int. Cl.$^7$ .............................................. B23Q 17/00
(52) U.S. Cl. ..................................... 29/407.02; 29/240
(58) Field of Search .............................. 29/407.02, 240

(56) References Cited

U.S. PATENT DOCUMENTS

| | | | |
|---|---|---|---|
| 3,939,920 A | * | 2/1976 | Hardiman et al. |
| 4,488,437 A | * | 12/1984 | Pere |
| 4,685,050 A | * | 8/1987 | Polzer et al. |
| 5,105,519 A | * | 4/1992 | Doniwa ............ 29/240 X |
| 5,502,883 A | * | 4/1996 | Ohmi et al. ............ 29/407.02 |

FOREIGN PATENT DOCUMENTS

| | | |
|---|---|---|
| DE | 32 30 642 | 2/1984 |
| DE | 35 21 937 | 1/1987 |
| DE | 40 24 577 | 2/1992 |
| DE | 40 33 494 | 4/1992 |
| EP | 0 096 620 | 12/1983 |

OTHER PUBLICATIONS

Kischkat et al., "Fehlererkennung bei automatischen Verschraubungen mit Hilfe von Fuzzy–Logik", Maschinenmarkt, 102, pp. 40–43, 1996.

* cited by examiner

*Primary Examiner*—Douglas Olms
*Assistant Examiner*—Steve Blount
(74) *Attorney, Agent, or Firm*—Crowell & Moring LLP

(57) ABSTRACT

A method for tightening screw connections in series assembly. The method includes continuously monitoring a torque and a rotational angle of the screw. Initially, the screw is tightened by turning it in a rotational direction through a first rotational angle by exerting a desired torque. The screw is then released by turning the screw in a reverse rotational direction through a particular rotational angle. The screw is then re-tightened by turning it in the rotational direction through a second rotational angle by exerting the desired torque. A first absolute difference in rotational angles between the first rotational angle and the second rotational angle is determined and the value for the first absolute difference in rotational angles is then utilized to provide a monitoring of the tightening characteristics in the screw. The conditions during the tightening and the releasing of the screw is thereby taken into consideration during the method of the present invention to determine the seating and tightening characteristics in the screw.

14 Claims, 2 Drawing Sheets

METHOD FOR TIGHTENING SCREW JOINTS

BACKGROUND AND SUMMARY OF THE INVENTION

The invention relates to a method for tightening screw connections in series assembly, in which a screw connection, in each case monitored with regard to torque and rotational angle, is tightened for a first time by a desired moment, then is released again over a certain rotational angle and is tightened for a second time by a desired moment.

In order to tighten screw connections in series assembly methods are known which are essentially controlled with respect to torque and/or with respect to rotational angle. Using these known methods the desired screw prestressing force of the particular screw connection is achieved more or less precisely, the said force being described as a parameter for each screw connection. However, a constant, reproducible quality of the screw connection, i.e. a uniform screw prestressing force during each tightening, cannot be achieved, since the screw prestressing, force obtained fluctuates considerably on account of a multiplicity of factors determining it. For example, oil and dirt in the thread effect the coefficient of friction which, in turn, has a direct effect on the screw prestressing force obtained with a prescribed torque. Furthermore, the properties of the tightening tool also have an effect on the resulting screw prestressing force, since, for example, when a motor is used, the latter when switched off still continues to rotate the screw to be tightened somewhat further because of the inertia of the masses involved and causes a higher screw prestressing force than desired.

In the case of the tightening method which is controlled with respect to torque and is based on the assumption that the prestressing force acting on the screw is proportional to the torque applied, the switching off point of the screwing procedure is prescribed by a defined measured value for the torque. In order to be able to arrive at this prescribed value for the torque during the tightening in a targeted manner, the profile of the torque can be monitored during the tightening, as is described, for example in U.S. Pat. No. 5,591 919, or the screw connection can be tightened in three stages using decreasing rotational speeds in each case, as is described in U.S. Pat. No. 5,062,491. It is also known, in order to shorten the time required for the clamping, to acquire parameters during preceding learning cycles in order thereby to be able to allow the motor to run at a high speed during tightening of the screw connections and to be able to stop it exactly when the desired torque is reached, as is described in European Patent Document EP 753 377 A1 corresponding to U.S. Pat. No. 5,650,574). Conversely, it is likewise known, in order to extend the time taken for the screwing procedure, to provide the tool with a spring which is arranged between the driving element and the gripping element of the tool, as is disclosed in German Patent Document DE 32 10 929 A1 corresponding to U.S. Pat. No. 4,463,293). In order to avoid vibrations of the spring here, at a prescribed tightening torque the motor is switched to run in reverse, in order to slacken the spring, then is switched off and switched briefly again into the original direction of rotation. Finally, German Patent Document DE 35 21 937 A1 discloses a tightening method which is controlled with respect to torque and in which the torque required for reaching the prescribed prestressing force can be determined free of frictional forces. For this purpose, before the tightening point is reached the screw connection is reversed over a certain rotational angle and, when a defined rotational angle is reached, is again tightened up to the tightening point. The clamping force applied to the screw is calculated free of frictional forces from the difference between the tightening torque and the counter torque in the defined rotational angle.

The tightening method which is controlled with respect to torque is based on the fact that when the screw head is screwed on and the components joined together, the extension of the screw and therefore the axial force produced in it is proportional to the angle over which the screw is rotated. Thus, for example, DE 42 14 354 A1 discloses a tightening method which is dependent on torque and rotational angle and in which during the tightening of the screw connection first of all the joining point is determined and then from this joining point the switching off point is determined either in accordance with prescribed values for the torque or in accordance with prescribed values for the rotational angle. It is known from U.S. Pat. No. 5,284,217 to monitor the torque and the rotational angle during the tightening in order thereby firstly to determine the required torque in order to reach a prescribed prestressing force and secondly to check whether a prescribed tolerance zone with regard to the torque and the rotational angle is being maintained. Finally, it is also known, in particular in the case of components which are relevant for safety, after the tightening to release the screws over a defined angle and to tighten them again by the prescribed desired moment. In this case, the torque is plotted over the rotational angle and the shape of the torque profile is used for an assessment with regard to the quality of the screw connection and causes of error (Maschinenmarkt, Würzburg 102 (1996) 20).

As already mentioned, using these known tightening methods it is possible, more or less precisely, to reach the required prestressing force of the screw connection, essentially by detecting the torque and rotational angle. However, the extent to which this prestressing force obtained is reduced during operation of the screw connection by seating phenomena cannot be assessed using this method. Seating phenomena occur in screw connections due to the material creeping as a consequence of the tightening and lead to an automatic loosening or even release of the screw connection due to the prestressing force being reduced.

Starting from this background, it is therefore the object of the present invention to provide a method for tightening screw connections in series assembly, in which a screw connection, in each case monitored with regard to torque and rotational angle, is tightened for a first time by a desired moment, is then released again over a certain rotational angle and is tightened for a second time by a desired moment, it being possible for seating phenomena in screw connections to be recognized using this method.

This object is achieved by the absolute difference in rotational angle between the first and the second tightening being determined, and by the magnitude of this amount of difference being used as a process-relevant parameter for monitoring purposes.

This determined absolute difference in rotational angle between the first and the second tightening is a gauge for seating phenomena as may occur in screw connections due to various reasons. By this means, seating phenomena in screw connections can easily be recognized even as the screw connection is being tightened, and by means of the comparison of the amount of difference determined with a prescribed tolerance value, the security of the screw connection can be significantly increased and therefore its quality as a whole improved.

If the absolute difference in rotational angle determined lies below a prescribed minimum difference in angle or above a prescribed maximum difference in angle, an impermissible angular offset exists which, apart from the assessment of seating phenomena or the seating extent, can also supply conclusions as to possible sources of error in the screw connection. According to a particularly preferred embodiment, the absolute difference in rotational angle is therefore compared with a prescribed minimum and maximum difference in rotational angle and an error message is produced if the difference in rotational angle determined lies above or below these prescribed values of the difference in angle.

These two additional parameters can be stored easily and without a large outlay in process control systems of existing assembly lines, with the result that the method according to the invention can be integrated in a simple manner in existing series assemblies. When there is an error message the screw connection is advantageously passed on to refinishing. In refinishing the rejected screw connection can be released and investigated and the cause of the error message eliminated. However, it is also possible to select the rejected screw connections in accordance with the type of error message in each case and, for example when the prescribed maximum difference in angle is exceeded, to pass the screw connection onto a second tightening procedure, which is provided in accordance with a further preferred embodiment of the invention. The absolute difference in rotational angle determined during the second tightening procedure is compared with the value determined during the first tightening procedure and an error message is produced if, with regard to this value, the second difference in rotational angle determined lies above or below the prescribed maximum or minimum difference in rotational angle. When there is an error message the screw connection is advantageously passed onto refinishing, since the cause could not be eliminated using the tightening procedure again and has to be investigated more precisely. If an error message is not produced, the cause for the error message during the first tightening/release procedure has been eliminated during the second tightening/release procedure, and because the prescribed tolerance value is maintained the screw connection can remain in the series assembly;

Although the absolute difference in rotational angle can be determined in any desired manner, provided that it is thereby possible to use the method in the series assembly, it is, however, of advantage if in order to determine the absolute difference in rotational angle, the torque applied is plotted over the actual rotational angle, so that a representation in loop form is produced. In this representation, the difference in rotational angle between the first tightening and the second tightening can then be recognized in a simple manner, so that in accordance with an advantageous embodiment, the difference in angle is determined from the looped representation of the torque/rotational angle.

In a representation of this type, compared to the customary continuous representation of torque and rotational angle, for one thing the forward rotation and reverse rotation of the screw connection can be readily represented by plotting the actual rotational angle and therefore its actual increase or decrease in size. For another thing, and more essential for the method according to the invention, the difference in rotational angle between the first and the second tightening can be taken directly from a representation of this type without deviations.

Other objects, advantages and novel features of the present invention will become apparent from the following detailed description of the invention when considered in conjunction with the accompanying drawing.

BRIEF DESCRIPTION OF THE DRAWING

The invention is described in greater detail below with reference to the drawing, in which.

DETAILED DESCRIPTION OF THE DRAWING

Figure 1:
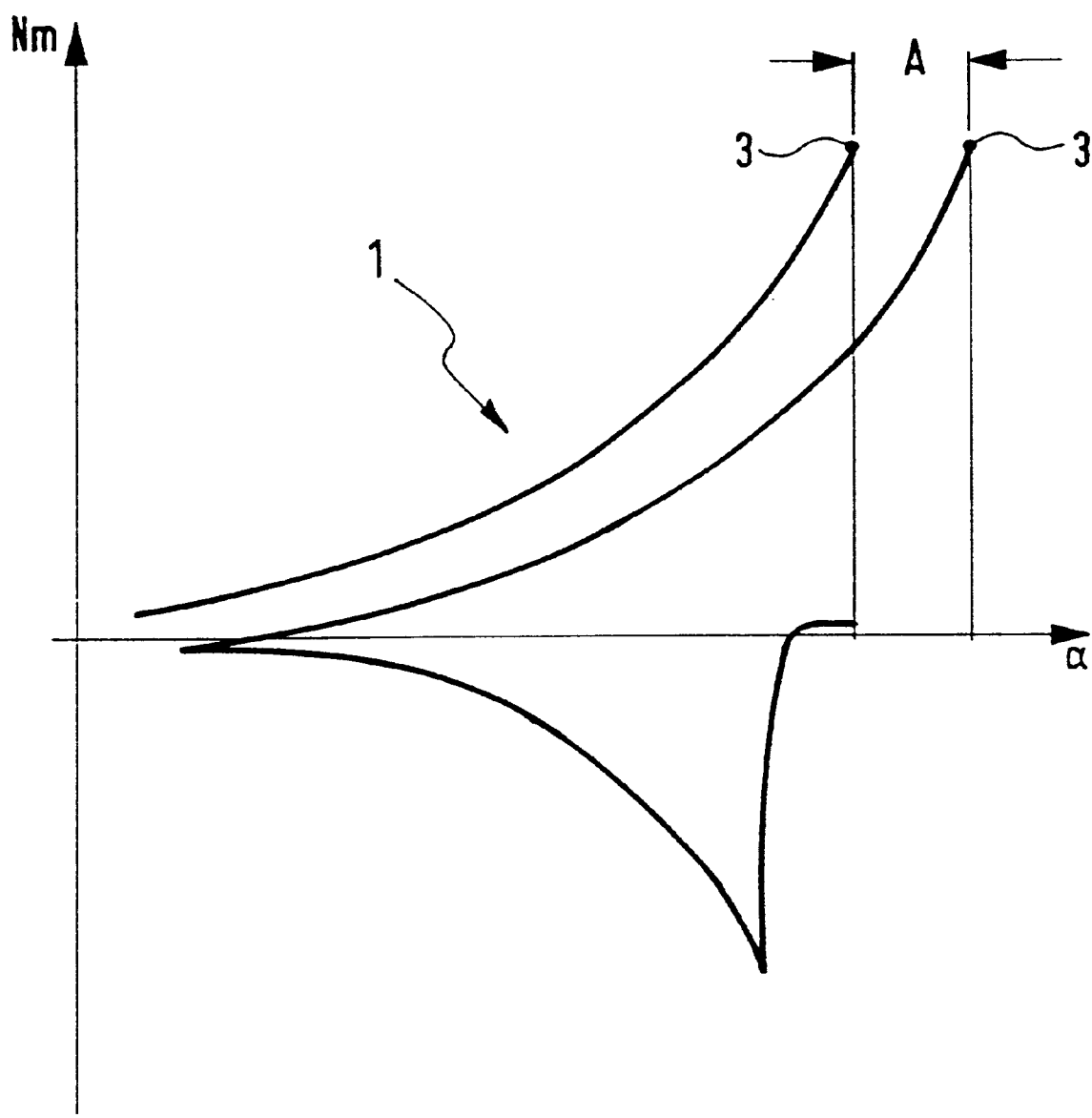
FIG. 1 illustrates a graphical representation of the screw tightening method of the present invention.
Figure 2:
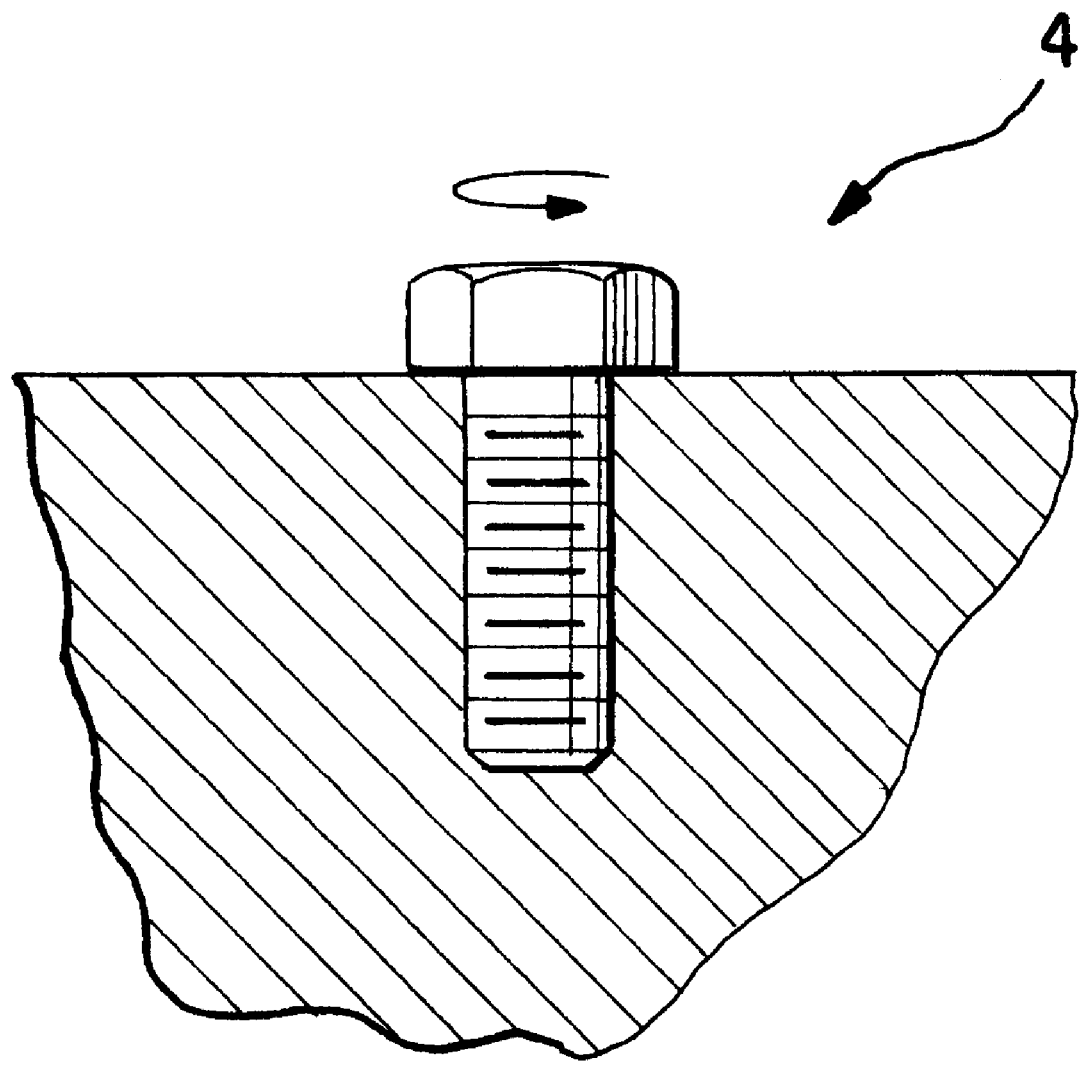
FIG. 2 illustrates a screw connection with which a method according to the present invention is useable.

In FIG. 1, the looped representation of torque/rotational angle can be seen, the torque Nm being plotted over the actual rotational angle $\alpha$. During the tightening of a screw connection 4, represented in FIG. 2, this results in the looped curve 1 which is represented and in which it can readily be recognized that the screw connection is initially tightened up to the desired moment 3, then the torque is reversed and the screw connection is released in order finally to be tightened again up to the desired torque 3. The difference A in rotational angle produced in this case can clearly be recognized on account of the form of representation selected, and can be used for monitoring purposes.

Using the method described here, the overall process of the tightening/release procedure is taken into account and inclusion of the difference in rotational angle as an additional process-monitoring parameter enables seating phenomena in screw connections to be recognized even as tightening is taking place.

What is claimed is:

1. A method for tightening a series of screw connections in which each screw connection is monitored with regard to torque and rotational angle comprising:
   tightening one of the screw connections for a first time through a first rotational angle and up to a desired moment,
   releasing said one of the screw connections over a certain rotational angle,
   tightening the one of the screw connections for a second time through a second rotational angle and by a desired moment,
   determining an absolute difference between the first and second rotational, and
   comparing said absolute difference with prescribed minimum and maximum differences for monitoring purposes.

2. The method according to claim 1, and further comprising producing an error message if the absolute difference lies above the prescribed maximum difference or below the prescribed minimum difference.

3. The method according to claim 2, and further comprising passing the one of the screw connections on for refinishing when there is an error message.

4. The method according to claim 2, and further comprising releasing the one of the screw connections for a second time and tightening the one of the screw connections for a third time when there is an error message and the prescribed maximum difference has been exceeded, comparing an absolute difference determined in this case with the absolute difference between the first and second angles, and producing an error message if the absolute difference determined in this case lies above the prescribed maximum difference or below the prescribed minimum difference.

5. The method according to claim 4, and further comprising passing the screw connection on for refinishing when there is an error message.

6. The method according to claim 1, wherein, in order to determine the absolute difference, a torque applied is plotted during tightening and releasing so that a representation in loop form is produced.

7. The method according to claim 6, wherein an impermissible angular offset falling below a minimum difference in angle or exceeding a maximum difference in angle is determined from the representation in loop form produced.

8. A method for tightening a screw connection comprising:
    continuously monitoring a torque and a rotational angle of the screw;
    tightening the screw by turning it in a rotational direction through a first rotational angle by exerting a desired torque;
    releasing the screw by turning the screw in a reverse rotational direction through a particular rotational angle;
    re-tightening the screw by turning it in the rotational direction through a second rotational angle by exerting the desired torque;
    determining a first absolute difference in rotational angles between the first rotational angle and the second rotational angle; and
    comparing the first absolute difference with prescribed minimum and maximum differences to monitor tightening characteristics in the screw.

9. The method of claim 8, further including producing an error message if the first absolute difference in rotational angles lies above the predetermined maximum difference or below the predetermined minimum difference in rotational angles.

10. The method of claim 9, and further comprising passing the screw on to a refinishing state if the error message is produced.

11. The method of claim 9, and further comprising releasing the screw again and then re-tightening the screw by turning the screw in the rotational direction through a third rotational angle by exerting the desired torque when the first absolute difference in rotational angles lies above the maximum difference in rotational angles and an error message is produced, determining a second absolute difference in rotational angles between the first rotational angle and the third rotational angle, and producing a second error message if the second absolute difference in rotational angles lies above the predetermined maximum difference or below the predetermined minimum difference in rotational angles.

12. The method of claim 11, and further comprising passing the screw on to a refinishing stage if the second error message is produced.

13. The method of claim 8, wherein determining the first absolute difference in rotational angles includes plotting the torque over the rotational angle and thereby producing a looped representation of torque/rotational angle.

14. The method of claim 13, further including using the looped representation of the torque/rotational angle to determine if the first absolute difference in rotational angles lies above or below the predetermined minimum and maximum differences in rotational angles.

* * * * *